United States Patent
Bloomquist et al.

(10) Patent No.: US 12,501,902 B2
(45) Date of Patent: Dec. 23, 2025

(54) COMPOSITIONS AND METHODS RELATING TO INSECTICIDES

(71) Applicant: University of Florida Research Foundation, Inc., Gainesville, FL (US)

(72) Inventors: Jeffrey R Bloomquist, Gainesville, FL (US); Edmund Norris, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 846 days.

(21) Appl. No.: 17/635,579

(22) PCT Filed: Aug. 23, 2020

(86) PCT No.: PCT/US2020/047555
§ 371 (c)(1),
(2) Date: Feb. 15, 2022

(87) PCT Pub. No.: WO2021/041278
PCT Pub. Date: Mar. 4, 2021

(65) Prior Publication Data
US 2022/0264897 A1   Aug. 25, 2022

Related U.S. Application Data

(60) Provisional application No. 62/890,808, filed on Aug. 23, 2019.

(51) Int. Cl.
*A01N 65/08* (2009.01)
*A01N 43/16* (2006.01)

(52) U.S. Cl.
CPC ............ *A01N 65/08* (2013.01); *A01N 43/16* (2013.01)

(58) Field of Classification Search
CPC .................. A01N 65/08; A01N 43/16
See application file for complete search history.

(56) References Cited

U.S. PATENT DOCUMENTS

| 2002/0115564 A1 | 8/2002 | Asrar et al. |
| 2008/0175812 A1 | 7/2008 | Seabrook et al. |
| 2014/0056853 A1 | 2/2014 | Marrone et al. |

FOREIGN PATENT DOCUMENTS

| CN | 102038007 A | | 5/2011 | |
| CN | 107372621 A | | 11/2017 | |
| CN | 110150287 A | * | 8/2019 | ............. A01G 13/00 |
| WO | 2010046463 A1 | | 4/2010 | |

OTHER PUBLICATIONS

International Search Report and Written Opinion for PCT/US2020/047555 mailed on Feb. 24, 2021.
Pyriproxyfen, PubChem, Oct. 20, 2020 (Oct. 20, 2020) [retrieved from internet on Oct. 23, 2020 (Oct. 23, 2020) <https://pubchem.ncbi.nlm.nih.gov/compound/Pyriproxyfen>] p. 4, p. 20.
El-Shazl Y. et al. 'Larvicidal effect of the juvenile hormone mimic pyriproxyfen on Culex pipiens.' J Am Mosq Control Assoc. Dec. 2002;18(4):321-8. PM\D: 12542190, p. 321-328.
Pymetrozine, ChemBook [retrieved from internet on Oct. 23, 2020 (Oct. 23, 2020) <https://pubchem.ncbi.nlm.nih.gov/compound/Pyriproxyfen>] pp. 1-13.
Clothianidin, Wikipedia, Jul. 24, 2020 (Jul. 24, 2020) [retrieved from internet on Nov. 2, 2020 (Nov. 2, 2020) <https://en.wikipedia.org/wiki/Clothianidin>] p. 1.

* cited by examiner

*Primary Examiner* — Zohreh A Fay
(74) *Attorney, Agent, or Firm* — Thomas|Horstemeyer, LLP (57) ABSTRACT

Described herein are compositions and methods relating to insecticides. In additional embodiments according to the present disclosure, administration devices and methods of such are also described. In certain aspects, compositions and methods as described herein comprise "Cha Plu" (*Piper sarmentosum*) extract. In certain aspects, compositions and methods as described herein further comprise an insecticide, for example natural pyrethrins or derivatives thereof. Compositions and methods as described herein utilize effective amounts of active ingredients of such compositions to induce knockdown and/or mortality of pests based on synergistic action of the "Cha Plu" (*Piper sarmentosum*) extract and natural pyrethrins together.

19 Claims, 4 Drawing Sheets

FIG. 1

Rutin               Vitexin (P450 inhibitors)

COMPOSITIONS AND METHODS RELATING TO INSECTICIDES

CROSS-REFERENCE TO RELATED APPLICATION

This application is the 35 U.S.C. § 371 national stage entry of PCT Application No. PCT/US2020/047555, filed Aug. 23, 2020, where the PCT claims priority to, and the benefit of, U.S. Provisional Application entitled "COMPOSITIONS AND METHODS RELATING TO INSECTICIDES," having Ser. No. 62/890,808, filed Aug. 23, 2019, both of which are incorporated herein by reference in their entireties.

FEDERAL SPONSORSHIP

This invention was made with government support under CK000510 awarded by the Centers for Disease Control and Prevention. The government has certain rights in the invention.

BACKGROUND

More effective insecticidal formulations are needed, especially in the public health arena. Insecticide resistance is increasing over time, prompting the need for novel insecticide formulations that can effectively knockdown and/or kill inserts of interest. Furthermore, a need exists for insecticide formulations with no or low-toxicity to humans. Accordingly, there is a need to address the aforementioned deficiencies and inadequacies.

SUMMARY

In aspects of the present disclosure, described herein are insecticide compositions. An insecticide composition according to the present disclosure can comprise *Piper sarmentosum* extract or compositions derived thereof. In certain aspects, insecticide compositions as described herein can comprise a carrier. Insecticide compositions as described herein can further comprises an insecticide. In embodiments, the insecticide of insecticide compositions as described herein is not *Piper sarmentosum* extract. Insecticide composition as described herein, in embodiments, further comprise natural pyrethrins. In an embodiment, an insecticide composition as described herein can consist of *Piper sarmentosum* extract. In embodiments, insecticide compositions as described herein can comprise rutin.

In embodiments, insecticides as described herein can comprise one or more of an acetylcholinesterase (AChE) inhibitor; a gamma-Aminobutyric acid (GABA)-gated chloride channel blocker; a sodium channel modulator; a nicotinic acetylcholine receptor (nAChR) competitive modulator; a nicotinic acetylcholine (nAChR) allosteric modulator—site I; a juvenile hormone mimic; an alkyl halide; a borate; a methyl isothiocyanate generator; a chordotonal organ transient receptor potential channel (vanilloid) (TRPV) channel modulator; a mite growth inhibitor affecting chitin synthase 1 (CHS1); a microbial disruptor of insect midgut membranes; an inhibitor of mitochondrial ATP synthase; an uncoupler of oxidative phosphorylation via disruption of the proton gradient; a nicotinic acetylcholine receptor (nAChR) channel blocker; an inhibitor of chitin biosynthesis affecting CHS1; an inhibitor of chitin biosynthesis type 1; an ecdysone receptor agonist; an octopamine receptor agonist; a mitochondrial complex III electron transport inhibitor; a mitochondrial complex I electron transport inhibitor; a voltage-dependent sodium channel blocker; an inhibitor of acetyl CoA carboxylase; a mitochondrial complex IV electron transport inhibitor; a mitochondrial complex II electron transport inhibitor; a ryanodine receptor modulator; a chordotonal organ modulator; a GABA-gated chloride channel allosteric modulator; a baculovirus; a nicotinic acetylcholine receptor (nAChR) allosteric modulator—site II; azadirachtin; benzoximate; bromopropylate; chinomethionat; dicofol; lime sulfur; mancozeb; pyridalyl; sulfur; *Burkholderia* spp; *Wolbachia pipientis* (Zap); *Chenopodium ambrosioides* near ambrosioides extract; fatty acid monoesters with glycerol or propanediol Neem oil; fungal agents (for example *Beauveria bassiana* strains, *Metarhizium anisopliae* strain F52, or *Paecilomyces fumosoroseus* Apopka strain 97); diatomaceous earth; veratrine; Sabadilla; paraffin oil; cottonseed oil; or a form of *Bacillus thuringiensis*.

In embodiments, the insecticide can comprise one or more of a carbamate, organochloride, organophosphate, pyrethroid, neonicotinoid, sulfoximine, butenolide, mesoionic, spinosyn, avermectin, milbemycin, pyridine azomethines, pyropene, phenylpyrazole, oxidiazine, semicarbazone, tetronic and tetramic acid, flonicamid, diamide, isoxazoline, azadiractin, pyridalyl, beta-ketonitrile, carboxanilide, ryanoid, mite growth inhibitors, clofentazine, diflovidazin, hexythiazox, etoxazole, buprofezin, cyromazine, amitraz, diacylhydrazine, pyrrole respiration uncouplers, electron transport inhibitors, hydramethylnon, acequinocyl, fluacrypyrim, bifenazate, or METI acaricide.

In embodiments, the insecticide is from the organochloride, organophosphate, pyrethroid, neonicotinoid, diamide, ryanoid, phenylpyrazole class of insecticides.

In embodiments, the insecticide comprises natural pyrethrins or a pyrethroid. In embodiments, the insecticide comprises a neonicotinoid. In embodiments, the insecticide comprises, the insecticide is clothianidin. In embodiments, the insecticide composition further comprises a carrier.

In embodiments, the insecticide composition comprises an effective amount of *Piper sarmentosum* extract at a concentration required to produce synergism with the insecticide.

In embodiments, the insecticide composition comprises an effective amount of *Piper sarmentosum* extract and insecticide effective to induce knockdown or mortality of a pest by about 50% or more.

In embodiments, the insecticide composition comprises an effective amount of *Piper sarmentosum* extract and insecticide effective to induce knockdown or mortality of a pest by about 50%.

In embodiments, an effective amount of *Piper sarmentosum* extract is a concentration of about 2.5 pg/mL to about 500 mg/mL. In embodiments, an effective amount of *Piper sarmentosum* extract is a concentration of about 4 µg/0.2 µL.

In embodiments, an effective amount of insecticide is a concentration of about 1 pM to about 100 µM. In embodiments, an effective amount of insecticide is a concentration of about 250 µM to about 1 µM. In embodiments, an effective amount of insecticide is a concentration of about 500 µM to about 750 nM. In embodiments, an effective amount of insecticide is a concentration of about 500 pM to about 750 nM. In embodiments, an effective amount of insecticide is a concentration of about 750 pM to about 500 nM. In embodiments, an effective amount of insecticide is a concentration of about 1 nM to about 250 nM. In embodiments, an effective amount of insecticide is a concentration of about 1 µM to about 100 µM. In embodiments, an effective amount of insecticide is a concentration of about 1 nM to about 100 nM.

In embodiments, an effective amount of *Piper sarmentosum* extract is about 2.5 ng/mL and the effective amount of insecticide is a concentration of about 1 nM. In embodiments, an effective amount of *Piper sarmentosum* extract is about 2.5 ng/mL and the effective amount of insecticide is a concentration of about 10 nM. In embodiments, an effective amount of *Piper sarmentosum* extract is about 2.5 ng/mL and the effective amount of insecticide is a concentration of about 100 nM.

Also described herein are methods of knocking down or inducing mortality of an insect or pest. Methods as described herein can comprise administering an insecticide composition as described herein to an environment in need thereof, the environment in need thereof comprising a pest or at risk for introduction of one or more pests. In certain aspects, methods as described herein can comprise administering an insecticide composition to a pest.

In certain aspects, the pest can be a mosquito. In certain aspects, the pest is a pest of the species *Aedes aegypti* or *Anopheles gambiae*.

Also described herein are methods of knocking down or inducing mortality of an insect or pest. Methods of knocking down or inducing mortality of an insect or pest comprise administering an insecticide composition as described herein to an environment in need thereof, wherein the environment in need thereof comprises a pest or at risk for introduction of one or more pests. In embodiments of methods according to the present disclosure, the pest is a mosquito. In embodiments according to the present disclosure, the pest is of the species *Aedes aegypti* or *Anopheles gambiae*.

In embodiments, methods as described herein can comprise administering an insecticide composition as described herein to an environment in need thereof, a pest, or both, wherein the environment in need thereof comprises a pest or at risk for introduction of one or more pests. In embodiments, the pest is a mosquito. In embodiments of methods described herein, the pest is of the species *Aedes aegypti* or *Anopheles gambiae*. In embodiments of methods described herein, the insecticide composition comprises an effective amount of *Piper sarmentosum* extract at a concentration required to produce synergism with the insecticide. In embodiments of methods described herein, the insecticide composition is administered in an amount effective to induce knockdown or mortality by about 50% or more. In embodiments of methods described herein the insecticide composition is administered in an amount effective to induce knockdown or mortality by about 50%. In embodiments of methods described herein, the effective amount of the insecticide composition comprises a concentration of *Piper sarmentosum* extract of about 4 µg/0.2 µL. In embodiments of methods described herein, the effective amount of the insecticide composition comprises a concentration of *Piper sarmentosum* extract of about 2.5 pg/mL to about 250 mL. In embodiments of methods described herein, the effective amount of the insecticide composition comprises a concentration of insecticide of about 1 pM to about 100 µM. In embodiments of methods described herein, the effective amount of insecticide composition comprises a concentration of *Piper sarmentosum* extract of about 2.5 ng/mL and a concentration of insecticide of about 1 nM to about 100 nM. In embodiments of methods described herein, the effective amount of insecticide composition comprises a concentration of *Piper sarmentosum* extract of about 2.5 ng/mL and a concentration of insecticide of about 1 nM. In embodiments of methods described herein, the effective amount of insecticide composition is an effective amount of *Piper sarmentosum* extract of about 2.5 ng/mL and a concentration of insecticide of about 10 nM. In embodiments of methods described herein, the effective amount of insecticide composition is an effective amount of *Piper sarmentosum* extract of about 2.5 ng/mL and a concentration of insecticide of about 100 nM.

Described herein are insecticide kits. In embodiments of insecticide kits described herein, an insecticide kit can comprise an insecticide as described herein; and an applicator. In embodiments of insecticide kits described herein, the applicator can be an aerosol spray can, a pump-spray bottle, a package for pharmaceutical cream, a fogger can, a bait station, or a syringe for injection. In embodiments of insecticide kits described herein, the insecticide composition comprises an effective amount of *Piper sarmentosum* extract at a concentration required to produce synergism with the insecticide. In embodiments of insecticide kits described herein, the insecticide composition is administered in an amount effective to induce knockdown or mortality by about 50% or more. In embodiments of insecticide kits described herein, the insecticide composition is administered in an amount effective to induce knockdown or mortality by about 50%.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, organic chemistry, insect control, pest control, entomology, toxicology, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, in an embodiment, "about" means±5% of the reference value and any intervening values. In an embodiment, "about" means±10% of the reference value and any intervening values. In an embodiment, "about" means±2.5% of the reference value and any intervening values. In an embodiment, "about" means±1% of the reference value and any intervening values. In an embodiment, "about" means±1% to ±10% of the reference value and any intervening values.

Discussion

Figure 1:
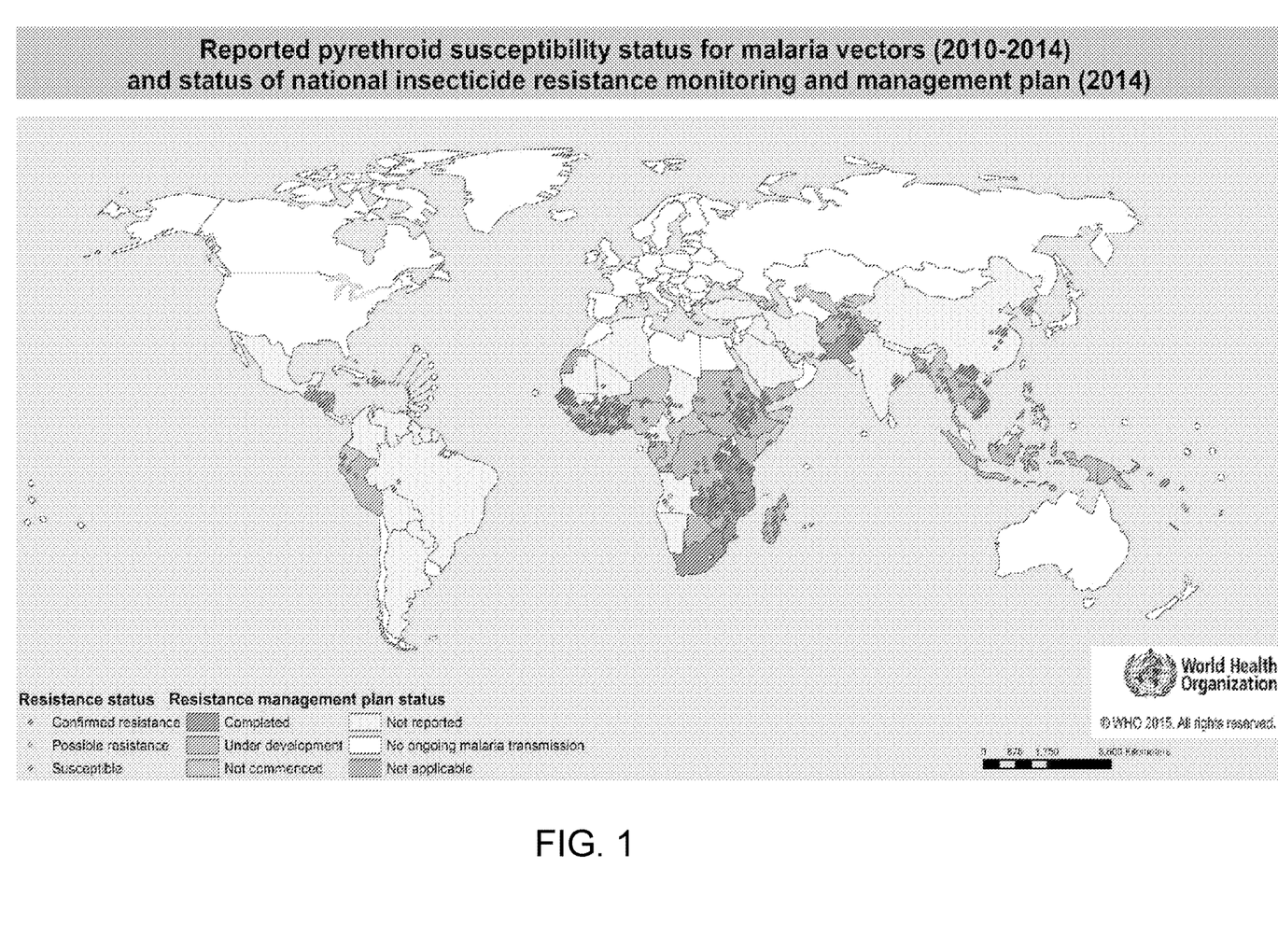
FIG. 1 is a cartoon showing world-wide national insecticide monitoring and management as of 2014.

There is a need for novel insecticides that are environmentally friendly and non-toxic to humans and other mammals, especially given the increase in insecticide resistance worldwide (FIG. 1). Embodiments of the present disclosure provide for compositions and methods relating to insecticides. Compositions and methods as described herein represent improvements over existing insecticide compositions and methods at least by providing compositions and methods that improve efficacy (improved insect knockdown and/or mortality) compared to existing compositions and methods while maintaining a low toxicity profile, in regard to humans and other mammals.

Figure 2:
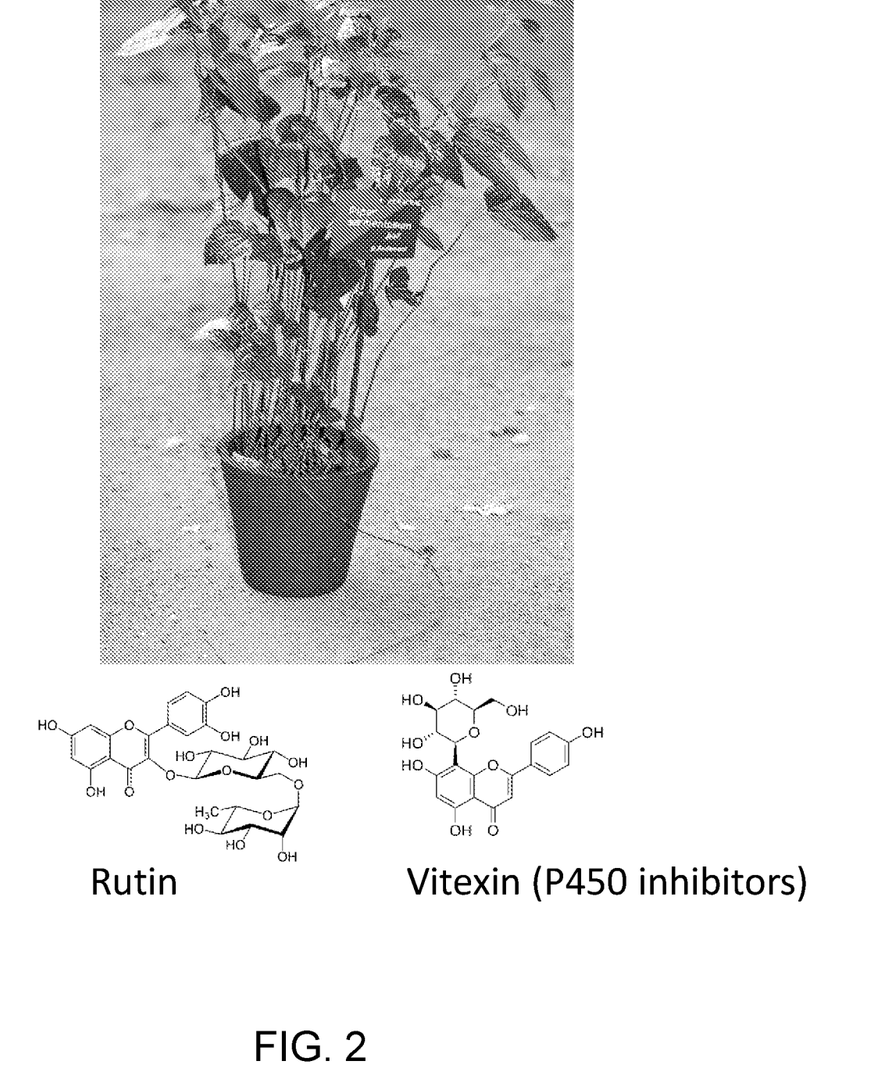
FIG. 2 shows the "Cha Plu" (*Piper sarmentosum*) plant and two of the compounds present in the extract of the plant.

"Cha Plu" (*Piper sarmentosum*) is a plant that has been used as a folk medicine for generations in Asia (FIG. 2). It is reported to contain numerous alkamides and phenylpropanoids in specific ratios/combinations not found in other plants. An extract from this plant can be used as a synergist and insecticide against *Aedes aegypti* mosquitoes in new insecticidal formulations. In certain aspects, such extracts are extracted from the plant are a result of processing and contain active ingredients of the plant (such as the leaf, root, or other aspects) that are present at a concentration that is higher than would normally be found from that part of the plant itself. Extraction methods as discussed further below.

As described herein, the inventors have found that *Piper sarmentosum* extract significantly synergizes the activity of the insecticidal natural pyrethrins, for example by a degree of about 10-fold. In embodiments, this enhancement was observed on both live insects and on electrical recordings of nerve activity in the larval *Drosophila melanogaster* central nervous system, in vitro. Thus, there may be multiple mechanisms of synergism operating with this disclosure; for example, one that is expressed pharmacokinetically and one that is pharmacodynamic in function. As described herein, "Cha Plu" (or extracts thereof) as a future insecticidal additive can lead toward better insecticides.

Insecticide Compositions

Described herein are insecticide compositions. In embodiments according to the present disclosure, insecticide compositions comprise an extract from *Piper sarmentosum* (also referred to herein as "Cha Plu"). In embodiments according to the present disclosure, insecticide compositions as described herein comprise an insecticide and *Piper sarmentosum* extract. In embodiments according to the present disclosure, insecticide compositions as described herein consist essentially of an insecticide and *Piper sarmentosum* extract.

Insecticide compositions as described herein can comprise an insecticide from the carbamate, organochloride, organophosphate, pyrethroid, neonicotinoid, sulfoximines, butenolides, mesoionics, spinosyns, avermectins, milbemycins, pyridine azomethines, pyropenes, phenylpyrazoles, oxidiazines, semicarbazones, tetronic and tetramic acids, flonicamid, diamide, isoxazolines, azadiractin, pyridalyl, or beta-ketonitriles, carboxanilides, ryanoid class of insecticides. The insecticide can further comprise: mite growth inhibitors (e.g., clofentazine, diflovidazin, hexythiazox, and etoxazole), buprofezin, cyromazine, amitraz, diacylhydrazines, pyrrole respiration uncouplers, electron transport inhibitors (e.g., hydrqmethylnon, acequinocyl, fluacrypyrim, and bifenazate), METI acaricides and insecticides. The insecticide can be clothianidin. The insecticide can be naled. The insecticide can comprise natural pyrethrins, permethrin, or deltamethrin, individually or in combination. In an embodiment, the insecticide comprises natural pyrethrins. In an embodiment, the insecticide comprises permethrin. In an embodiment, the insecticide comprises deltamethrin.

Insecticides of insecticide compositions as described herein can be of the carbamate, organochloride, organophosphate, pyrethroid, neonicotinoid, sulfoximine, butenolide, mesoionic, spinosyn, avermectin, milbemycin, pyridine azomethines, pyropene, phenylpyrazole, oxidiazine, semicarbazone, tetronic and tetramic acid, flonicam id, diamide, isoxazoline, azadiractin, pyridalyl, beta-ketonitrile, carboxanilide, ryanoid, mite growth inhibitors, clofentazine, diflovidazin, hexythiazox, etoxazole, buprofezin, cyromazine, amitraz, diacylhydrazine, pyrrole respiration uncouplers, electron transport inhibitors, hydromethylnon, acequinocyl, fluacrypyrim, bifenazate, or METI acaricide.class.

Insecticides of insecticide compositions as described herein can be: an acetylcholinesterase (AChE) inhibitor (for example a carbamate, such as Alanycarb or Aldicarb, or an organophosphate, such as Acephate or Azamethiphos); a gamma-Aminobutyric acid (GABA)-gated chloride channel blocker (for example a cyclodiene or organochlorine, such as Chlordane or Endosulfan, or a phenylpyrazole, such as Ethiprole or Fipronil); a sodium channel modulator (for example pyrethroids and pyrethrins, such as Acrinathrin or Allethrin, or Dichlorodiphenyltrichloroethane or Methoxychlor); a nicotinic acetylcholine receptor (nAChR) competitive modulator (for example a neonicotinoid, nicotine, sulfoximine, butenolides, or mesoionics); a nicotinic acetylcholine (nAChR) allosteric modulator—site I (for example spinosyns, such as Spinetoram or Spinosad); a glutamate-gated chloride channel (GluCl) allosteric modulator (for example Avermectins or Milbemycins); a juvenile hormone mimic (for example juvenile hormone analogues, such as Hydroprene, or Fenoxycarb or Pyriproxyfen); an alkyl halide (for example methyl bromide); chloropicrin, a fluoride (for example cryolite or sulfuryl fluoride); a borate (for example borax or boric acid); tartar emetic; a methyl isothiocyanate generator (for example Dazomet or Metam); a chordotonal organ transient receptor potential channel (vanilloid) (TRPV) channel modulator (for example a pyridine azomethine derivative or pyropenes); a mite growth inhibitor affecting chitin synthase 1 (CHS1) (for example clofentezine, diflovidazin, or hexythiazox, or etoxazole); a microbial disruptor of insect midgut membranes (for example a *Bacillus thuringiensis, Bacillus sphaericus* or one or more proteins produced by either); an inhibitor of mitrochondrial ATP synthase (for example Diafenthiuron, Organotin miticides, Propargite, or Tetradifon); an uncoupler of oxidative phosphorylation via disruption of the proton gradient (for example pyrroles, dinitrophenols, or sulfluramid); a nicotinic acetylcholine receptor (nAChR) channel blocker (for example a nereistoxin analog such as bensultap); an inhibitor of chitin biosynthiesis affecting CHS1 (for example benzoylureas such as bistrifluron); an inhibitor of chitin biosynthesis type 1 (for example buprofezin); a molting disruptor, dipteran (for example cyromazine); an ecdysone receptor agonist (for example diacylhydrazines, such as chromofenozide); an octopamine receptor agonist (for example amitraz); a mitochondrial complex III electron transport inhibitor (for example hydramethylnon, acequinocyl, fluacrypyrim, or bifenazate); a mitochondrial complex I electron transport inhibitor (for example mitochondrial electron transport inhibitor (METI) acaricides and insecticides, such as fenazaquin and fenpyroximate, or rotenone); a voltage-dependent sodium channel blocker (for example oxadiazines, such as indoxacarb, or semicarbazones, such as metaflumizone); an inhibitor of acetyl CoA carboxylase (for example tetronic and tetramic acid derivatives, such as spirodiclofen, spiromesifen, and spirotetramat); a mitochondrial complex IV electron transport inhibitor (for example phosphides, such as aluminum phosphide, calcium phosphide, phosphine, or zinc phosphide, or cyanides, such as calcium cyanide, potassium cyanide, or sodium cyanide); a mitochondrial complex II electron transport inhibitor (for example beta-ketonitrile derivatives, such as cyenopyrafen, or carboxanilides, such as pyflubumide); a ryanodine receptor modulator (for example diamides, such as chlorantraniliprole, cyantraniliprole, cyclaniliprole, or flubendiamide); a chordotonal organ modulator (for example flonicamid); a GABA-gated chloride channel allosteric modulator (for example meta-diamides or isoxazolines, such as fluralaner, broflanilide, or fluxametamide); a baculovirus (for example a granulovirus, such as *Cydia pomonella* GV, or a nucleopolyhedrovirus, such as *Anticarsia gemmatalis* MNPV or *Helicoverpa armigera* NPV); a nicotinic acetylcholine receptor (nAChR) allosteric modulator—site II (for example GS-omega/kappa HXTX-Hv1a peptide); azadirachtin; benzoximate; bromopropylate; chinomethionat; dicofol; lime sulfur; mancozeb; pyridalyl; sulfur; *Burkholderia* spp; *Wolbachia pipientis* (Zap); *Chenopodium ambrosioides* near ambrosioides extract; fatty acid monoesters with glycerol or propanediol Neem oil; fungal agents (for example *Beauveria bassiana* strains, *Metarhizium anisopliae* strain F52, or *Paecilomyces fumosoroseus* Apopka strain 97); or diatomaceous earth.

Without intending to be limiting, embodiments of insecticides according to the present disclosure include: fenitrothion [O,O-dimethyl O-(3-methyl-4-nitrophenyl) phosphorothioate], fenthion [O,O-dimethyl O-(3-methyl-4-(methylthio)phenyl) phosphorothioate], diazinon [O,O-diethyl O-2-isopropyl-6-methylpyrimidin-4-yl phosphorothioate], chlorpyrifos [O,O-diethyl O-3,5,6-trichloro-2-pyridyl phosphorothioate], DDVP [2,2-dichlorovinyl dimethyl phosphate], cyanophos [O-4-cyanophenyl O,O-dimethyl phosphorothioate], dimethoate [O,O-dimethyl S—(N-methylcarbamoylmethyl) dithiophosphate], pirimiphos methyl [O-[2-(Diethylamino)-6-methylpyrimidin-4-yl] O,O-dimethyl phosphorothioate]; phenthoate [ethyl 2-dimethoxyphosphinothioylthio(phenyl)acetate], and azinphos-methyl [S-3,4-dihydro-4-oxo-1,2,3-benzotriazin-3-ylmethyl O,O-dimethyl phosphorodithioate]; carbamate compounds such as BPMC (2-sec-butylphenyl methylcarbamate), benfracarb [ethyl N-[2,3-dihydro-2,2-dimethylbenzofuran-7-yloxycarbonyl (methyl)aminothio]-N-isopropyl-β-alaninate], propoxur [2-isopropoxyphenyl N-methylcarbamate] and carbaryl [1-naphthyl-N-methylcarbamate], methomyl [S-methyl-N-[(methylcarbamoyl)oxy] thioacetimidate]; pyrethroid compounds such as etofenprox [2-(4-ethoxyphenyl)-2-methylpropyl-3-phenoxybenzyl ether], fenvalerate [(RS)-α-cyano-3-phenoxybenzyl (RS)-2-(4-chlorophenyl)-3-methylbutyrate], esfenvalerate [(S)-α-cyano-3-phenoxybenzyl (S)-2-(4-chlorophenyl)-3-methylbutyrate], fenpropathrin [(RS)-α-cyano-3-phenoxybenzyl 2,2,3,3-tetramethylcyclopropanecarboxylate], cypermethrin [(RS)-α-cyano-3-phenoxybenzyl (1RS)-cis,trans-3-(2,2-dichlorovinyl)-2,2-dimethylcyclopropanecarboxylate], permethrin [3-phenoxybenzyl (1RS)-cis,trans-3-(2,2-dichlorovinyl)-2,2-dimethylcyclopropanecarboxylate], cyhalothrin [(RS)-α-cyano-3-phenoxybenzyl (Z)-(1RS)-cis-3-(2-chloro-3,3,3-trifluoroprop-1-enyl)-2,2-dimethylcyclopropanecarboxylate], deltamethrin [(S)-α-cyano-3-phenoxybenzyl (1R)-cis-3-(2,2-dibromovinyl)-2,2-dimethylcyclopropanecarboxylate], cycloprothrin [(RS)-α- cyano-3-phenoxybenzyl (RS)-2,2-dichloro-1-(4-ethoxyphenyl)cyclopropanecarboxylate], fluvalinate [α-cyano-3-phenoxybenzyl N-(2-chloro-α,α,α-trifluoro-p-tolyl)-D-valinate], bifenthrin [2-methylbiphenyl-3-ylmethyl (Z)-(1RS)-cis-3-(2-chloro-3,3,3-trifluoroprop-1-enyl)-2,2-dimethylcyclopropanecarboxylate], 2-methyl-2-(4-bromodifluoromethoxyphenyl)propyl 3-phenoxybenzyl ether, tralomethrin [(S)-α-cyano-3-phenoxybenzyl (1R-cis)-3-{(1RS)(1,2,2,2-tetrabromoethyl)}-2,2-dimethylcyclopropanecarboxylatel silafluofen [(4-ethoxyphenyl){3-(4-fluoro-3-phenoxyphenyl)propyl}dimethylsilane], d-phenothrin [3-phenoxybenzyl (1R-cis,trans)-chrysanthemate], cyphenothrin [(RS)-α-cyano-3-phenoxybenzyl (1R-cis,trans)-chrysanthemate], d-resmethrin [5-benzyl-3-furylm ethyl (1R-cis,trans)-chrysanthemate], acrinathrin [(S)-α-cyano-3-phenoxybenzyl (1R,cis(Z))-2,2-dimethyl-3-{3-oxo-3-(1,1,1,3,3,3-hexafluoropropyloxy) propenyl}cyclopropanecarboxylate], cyfluthrin [(RS)-α-cyano-4-fluoro-3-phenoxybenzyl 3-(2,2-dichlorovinyl)-2,2-dimethylcyclopropanecarboxylate], tefluthrin [2,3,5,6-tetrafluoro-4-methylbenzyl (1RS-cis(Z))-3-(2-chloro-3,3,3-trifluoroprop-1-enyl)-2,2-dimethylcyclopropanecarboxylate], transfluthrin [2,3,5,6-tetrafluorobenzyl (1R-trans)-3-(2,2-dichlorovinyl)-2,2-dimethylcyclopropanecarboxylate], tetramethrin [3,4,5,6-tetrahydrophthalimidomethyl (1RS)-cis,trans-chrysanthemate], allethrin [(RS)-3-allyl-2-methyl-4-oxocyclopent-2-enyl (1RS)-cis,trans-chrysanthemate], prallethrin [(S)-2-methyl-4-oxo-3-(2-propynyl)cyclopent-2-enyl (1R)-cis,trans-chrysanthemate], empenthrin [(RS)-1-ethynyl-2-methyl-2-pentenyl (1R)-cis,trans-chrysanthemate], imiprothrin [2,5-dioxo-3-(prop-2-ynyl)imidazolidin-1-ylmethyl (1R)-cis,trans-2,2-dimethyl-3-(2-methylprop-1-enyl)cyclopropanecarboxylate], d-furamethrin [5-(2-propynyl)furfuryl (1R)-cis,trans-chrysanthemate] and 5-(2-propynyl)furfuryl 2,2,3,3-tetramethylcyclopropanecarboxylate; nitroimidazole derivatives such as imidacloprid (1-(6-chloro-3-pyridylmethyl)-N-nitroimidazolidin-2-ylideneamine); N-cyanoamidine derivatives such as N-cyano-N'-methyl-N'-(6-chloro-3-pyridylmethyl)acetamidine; nitenpyram [N-(6-chloro-3-pyridylmethyl)-N-ethyl-N-methyl-2-nitrovynylidenediamine]; thiacloprid [1-(2-chloro-5-pyridylmethyl)-2-cyanoiminothiazoline]; dinotefuran [2-methyl-1-nitro-3-[(tetrahydro-3-furanyl) methyl] guanidine]; clothianidin [1-(2-Chloro-1,3-thiazol-5-ylmethyl)-3-methyl-2-nitroguanidine]; 1-methyl-2-nitro-3-((3-tetrahydrofuryl)methyl)guanidine; imidacloprid 1-(2-chloro-5-thiazolyl)methyl-3-methyl-2-nitroguanidine; nitroiminohexahydro-1,3,5-triazine derivatives; chlorinated hydrocarbons such as endosulfan [6,7,8,9,10,10-hexachloro-1,5,5a,6,9,9a-hexahydro-6,9-methano-2,4,3-benzodioxathiepine oxide], γ-BHC [1,2,3,4,5,6-hexachlorocyclohexane] and 1,1-bis(chlorophenyl)-2,2,2-trichloroethanol; benzoylphenylurea compounds such as chlorfluazuron [1-(3,5-dichloro-4-(3-chloro-5-trifluoromethylpyridyn-2-yloxy) phenyl)-3-(2,6-difluorobenzoyl)urea], teflubenzuron [1-(3,5-dichloro-2,4-difluorophenyl)-3-(2,6-difluorobenzoyl) urea] and flufenoxuron [1-(4-(2-chloro-4-trifluoromethylphenoxy)-2-fLuorophenyl)-3-(2,6-difluorobenzoyl)urea]; juvenile hormone like compounds such as pyriproxyfen [4-phenoxyphenyl 2-(2-pyridyloxy) propyl ether], methoprene [isopropyl (2E,4E)-11-methoxy-3,7,11-trimethyl-2,4-dodecadienoate] and hydroprene [ethyl (2E,4E)-11-methoxy-3,7,11-trimethyl-2,4-dodecadienoate]; thiourea derivatives such as diafenthiuron [N-(2,6-diisopropyl-4-phenoxyphenyl)-N'-tert-butylcarbodiimide]; phenylpyrazole compounds; metoxadiazone [5-methoxy-3-(2-methoxyphenyl)-1,3,4-oxadiazol-2(3H)-one], bromopropylate [isopropyl 4,4-dibromobenzilate], tetradifon [4-chlorophenyl 2,4,5-trichlorophenyl sulfone], chinomethionat [S,S-6-methylquinoxaline-2,3-diyldithiocarbonate], pyridaben [2-tert-butyl-5-(4-tert-butylbenzylthio)-4-chloropyridazin-3(2H)-one], fenpyroximate [tert-butyl (E)-4-[(1,3-dimethyl-5-phenoxypyrazol-4-yl)methyl-eneaminooxymethyl]benzoate], tebufenpyrad [N-(4-tert-butylbenzyl)-4-chloro-3-ethyl-1-methyl-5-pyrazolecarboxamide], polynactins complex [tetranactin, dinactin and trinactin], pyrimidifen [5-chloro-N-[2-{4-(2-ethoxyethyl)-2,3-dimethylphenoxy}ethyl]-6-ethylpyrimidin-4-amine], milbemectin/milbemycin, abamectin, ivermectin and azadirachtin [AZAD].

Other embodiments of insecticides according to the present disclosure include veratrine, Sabadilla, paraffin oil, cottonseed oil, essential oils (Almond Oil Bitter, Almond Oil Sweet, Amyris Oil W.I., Angelica Root Oil, Angelica Seed Oil, Anise Oil Chinese, Anise Oil Spanish, Anise Oil Vietnam, Aniseed Oil, Aniseed Oil Terpenes, Apricot Kernel Oil, Armoise Oil, Artemesia Afra, Asafoetida Oil, Avocado Oil, Balsam Copaiba, Balsam Copaiba Oil, Balsam Fir Canada, Balsam Peru, Balsam Peru Oil, Balsam Tolu PG, Basil Oil Comores Type, Basil Oil Indian, Basil Oil Linalool Type, Bay Oil Terpeneless Type, Bay Oil W.I., Bay Oil W.I. Bleached & Filtered, Bay Terpenes PG, Beeswax Absolute, Benzoin Siam Resin, Bergamot Oil, Bergamot Oil B.F., Bergamot Oil Residues, Bergamot Oil Terpenes, Birch Tar Crude, Birch Tar Rectified, Black Currant Bud Absolute, Blood Orange Oil, Bois de Rose Oil, Boronia Absolute Tasmanian, Brominated Vegetable Oil, Buchu Leaf Oil Betulina, Buchu Leaf Oil Crenulata, Buchu Oil, Sulfur Fractions 40%, Cabreuva Oil, Cade Oil, Cade Oil Rectified, Cajeput Oil, Calamus Oil, Camphor Oil 1.070, Camphor Oil Chinese, Camphor Oil White Taiwan, Cananga Oil, Caraway Oil, Cardamom Oil, Carrot Seed Oil, Carvene, Cascarilla Bark Oil, Cassia Oil, Catnip Oil, Cedarleaf Oil, Cedarwood Oil Atlas, Cedarwood Oil Chinese, Cedarwood Oil Texas, Cedarwood Oil Texas Redistilled, Cedarwood Oil Virginiana, Celery Seed Oil, Chamomile Oil Blue, Chamomile Oil Roman, Chamomile Oil Wild Maroc, Cinnamon Bark Oil, Cinnamon Leaf Oil Ceylon, Cistus Absolute, Cistus Oil, Citronella Oil Java 85/35, Citronella Oil Chinese 85/35, Citronella Oil Ceylon, Citronella Terpenes, Clove Bud Indonesian, Clove Bud Oil Prime, Clove Leaf Oil Indonesian 70/80, Clove Leaf Oil Madagascar 80/82, Clove Leaf Oil Redistilled, Clove Stem Oil, Clove Terpenes, Coffee Oil, Cognac Oil Green, Cognac Oil White, Coriander Herb Oil (Cilantro), Coriander Seed Oil, Cornmint Oil 50% Dementh. India, Cornmint Oil 50% Dementh. China, Cornmint Oil Rectified, Cubeb Oil, Cumin Seed Oil, Cypress Oil, Davana Oil, Dillseed Oil, Dillweed Oil, Eucalyptus Citriodora Brazil, Eucalyptus Citriodora Chinese, Eucalyptus Oil 70/75, Eucalyptus Oil 80/85, Eucalyptus Oil Terpenes, Eucalyptus Smithii Oil S.A., Evening Primrose, Fennel Oil, Fennel Oil Bitter, Fennel Oil Sweet, Fir Balsam Absolute, Fir Balsam Concrete, Fir Balsam Canadian, Fir Needle Oil Canadian, Fir Needle Oil Siberian, Fir Needle Oil Chinese, Galangal Root Oil, Galbanum Oil, Galbanum Resinoid, Garlic Oil Chinese, Garlic Oil Mexican, Genet Absolute, Geranium Oil Chinese, Geranium Oil Egyptian, Ginger Oil Chinese, Ginger Oil Fresh, Ginger Oil Indian, Grapefruit Oil 5x, Grapefruit Oil Pink C.P., Grapefruit Oil Washed, Grapefruit Oil White C.P., Grapefruit Terpenes, Grapeseed Oil, Gum Benzoin Siam Resin, Gurjon Balsam Oil, Guaiacwood Oil, Helichrysum Oil, Hemlock Oil, Ho Leaf Oil, Hop Oil, Horseradish Oil, Howood Oil 95%, Hyssop Oil, Jasmine Absolute, Jojoba Oil Purified White, Juniperberry Oil, Labdanum Gum Refined, Lanyana Oil, Laurel Leaf Oil, Lavandin Abrialis, Lavandin Grosso, Lavender Absolute Bulgarian, Lavender Oil 16%, Lavender Oil 40/42 French, Lavender Oil Bulgarian, Lavender Oil Spike, Lemon Essence Oil, Lemon Oil Argentina, Lemon Oil Brazil, Lemon Oil California 5×, Lemon Oil California Type, Lemon Oil Distilled, Lemon Oil Israeli, Lemon Oil Washed, Lemon Terpenes, Lemongrass Oil Guatemalan, Lemongrass Oil East Indian, Lemongrass Terpenes, Lemongrass Oil Terpeneless, Lime Essence Oil Phase, Lime Oil Mexican C.P., Types A & B, Lime Oil Distilled Mexican, Lime Oil Distilled Terpenes, Lime Oil Expressed Terpenes, Lime Oil Peru Distilled, Lime Oil Washed, Lime Sesqui Fractions, Lime Terpenes, Litsea Cubeba Oil, Litsea Terpenes, Lovage Leaf Oil, Lovage Root Oil, Mandarin Essence Oil Phase, Mandarin Oil Brazil, Mandarin Oil Green, Mandarin Oil Italian, Mandarin Oil Red Argentina, Mandarin Terpenes, Mandarin Petitgrain Terpeneless, Marjoram Oil Spanish, Marjoram Oil Sweet Egyptian, Massoia Bark Oil, Melissa Oil, Mentha Arvensis Oil, Mentha Citrata Oil, Mentha Piperita Oil, Milfoil Oil, Mimosa Absolute, Mousse de Arbre, Mousse de Pin Absolute, Mustard Oil Natural, Mustard Oil Synthetic, Myrrh Oil, Myrtle Oil, Neroli Oil, Nutmeg Oil, Nutmeg Oil Ceylon, Nutmeg Oil E.I., Nutmeg Terpenes, Oakmoss Absolute Green, Ocotea Cymbarum, Olibanum Oil, Olibanum Resin, Opoponax Oil, Onion Oil Egyptian, Onion Oil Mexican, Orange Juice Oil BJ N&A, Orange Essence Oil Phase, Orange Oil 5×, Orange Oil 10×, Orange Oil Bitter Ivory Coast Type, Orange Oil Bitter West Indian, Orange Oil Bitter Brazil, Orange Oil S.A., Orange Oil Midseason, Orange Oil Valencia, Orange Oil Terpeneless, Orange Terpenes, Organic Artemesia Oil, Organic Balsam Copaiba Oil, Organic Bois de Rose Oil, Organic Dillweed Oil, Organic Juniper Berry Oil, Organic Lavender Oil, Bulgarian, Organic Peppermint Oil, Organic Tea Tree Oil, Organic Wormwood Oil European, Organic Zdravetz Oil, Origanum Oil, Orris Root Concrete 8% Irone, Palmarosa Oil, Parsley Leaf Oil, Parsley Seed Oil, Patchouli Oil Indonesian, Patchouli Oil Light, Patchouli Oil Molecular Distilled, Pennyroyal Oil, Pepper Oil Black, Peppermint Oil Hotchkiss Type, Peppermint Oil Mitcham Type, Peppermint Oil Piperita Chinese, Peppermint Oil Piperita Indian, Peppermint Oil Piperita Redistilled, Peppermint Oil Piperita Williamette, Peppermint Oil Piperita Yakima, Peppermint Oil Terpenes, Perilla Oil, Petitgrain Oil S.A., Petitgrain Terpenes, Pimento Berry Oil, Pimento Leaf Oil, Pink Pepper Oil (Schinus Molle), Pinus Oil Pumilio, Pinus Oil Sylvestris, Rose Absolute Bulgarian, Rose Absolute Maroc, Rose Concrete Bulgarian, Rose Oil Bulgarian, Rose Oil Maroc, Rose Oil Turkish, Rose Water Concentrate, Rosemary Oil Maroc, Rosemary Oil Spanish, Rosemary Oil Tunisian, Rue Oil, Sage Oil 30%, Sage Oil 50%, Sage Oil Clary, Sage Oil Spanish, Sandalwood Oil Australian, Sandalwood Oil East Indian, Sandalwood Oil Indonesian, Sandalwood Oil Sri Lanka, Sassafras Oil, Savory Oil, Siamwood Oil, Spearmint Oil 65% Indian, Spearmint Oil Chinese 60%, Spearmint Oil Chinese 80%, Spearmint Oil Native, Spearmint Oil Terpeneless, Spearmint Terpenes, Spike Lavender Oil, Spikenard Oil, Spruce Absolute, Spruce Oil Canadian, Styrax Gum Honduras, Styrax Oil Honduras, Tagetes Oil Argentina, Tagetes Oil South African, Tagetes Oil Zimbabwe, Tangerine Oil 5×, Tangerine Oil 10×, Tangerine Oil CP China, Tangerine Oil CP Cravo, Tangerine Oil CP Florida, Tangerine Terpenes, Tarragon Oil, Tea Tree Oil, Thuja Oil, Thyme Oil Red, Thyme Oil White, Tolu Balsam, Tonka Bean Absolute, Perfume Grade, Treemoss Absolute, Tuberose Absolute, Valerian Root Oil, Vetiver Oil Indonesian, Vetiver Terpenes, Vetiver Oil Brazil, Violet Leaf Absolute, Wintergreen Oil Redistilled, Wormwood Oil American, Wormwood Oil European, Yarrow Oil (Milfoil), Ylang Oil #1, Ylang Oil #2, Ylang Oil #3, Ylang Oil Extra, and Zdravetz Oil), and all forms of *Bacillus thuringiensis*.

In embodiments according to the present disclosure, the insecticide can be an organophosphate. In embodiments according to the present disclosure, the insecticide is naled (Dibrom®).

In embodiments according to the present disclosure, the insecticide can be a pyrethroid or pyrethrin (i.e. naturally occurring organic compounds extracted and isolated in a non-naturally occurring form from *Chrysanthemum cinerariifolium* or synthetic derivative thereof). In embodiments according to the present disclosure, the insecticide is natural pyrethrin[s] (for example group I or II pyrethrins, such as pyrethrin I, cinerin I, jasmolin I, pyrethrin II, cinerin II, jasmolin II, individually or in combination, or compositions extracted and isolated from the *Chrysanthemum* flower through petroleum extraction or extraction with another organic solvent, and concentrated to a concentration higher than naturally occurring), permethrin, or deltamethrin, individually or in combination. Pyrethrins according to the present disclosure are present in compositions as described herein at a concentration higher than what would otherwise be considered naturally occurring.

In embodiments of the present disclosure, the insecticide can be a pyrethroid. Examples of pyrethroids according to the present disclosure include acrinathrin or dichlorodiphenyltrichloroethane, methoxychlor, etofenprox [2-(4-ethoxyphenyl)-2-methylpropyl-3-phenoxybenzyl ether], fenvalerate [(RS)-α-cyano-3-phenoxybenzyl (RS)-2-(4-chlorophenyl)-3-methylbutyrate], esfenvalerate [(S)-α-cyano-3-phenoxybenzyl (S)-2-(4-chlorophenyl)-3-methylbutyrate], fenpropathrin [(RS)-α-cyano-3-phenoxybenzyl 2,2,3,3-tetramethylcyclopropanecarboxylate], cypermethrin [(RS)-α-cyano-3-phenoxybenzyl (1RS)-cis,trans-3-(2,2-dichlorovinyl)-2,2-dimethylcyclopropanecarboxylate], permethrin [3-phenoxybenzyl (1RS)-cis,trans-3-(2,2-dichlorovinyl)-2,2-dimethylcyclopropanecarboxylate], cyhalothrin [(RS)-α-cyano-3-phenoxybenzyl (Z)-(1RS)-cis-3-(2-chloro-3,3,3-trifluoroprop-1-enyl)-2,2-dimethylcyclopropanecarboxylate], deltamethrin [(S)-α-cyano-3-phenoxybenzyl (1R)-cis-3-(2,2-dibromovinyl)-2,2-dimethylcyclopropanecarboxylate], cycloprothrin [(RS)-α-cyano-3-phenoxybenzyl (RS)-2,2-dichloro-1-(4-ethoxyphenyl)cyclopropanecarboxylate], fluvalinate [α-cyano-3-phenoxybenzyl N-(2-chloro-α,α,α-trifluoro-p-tolyl)-D-valinate], bifenthrin [2-methylbiphenyl-3-ylmethyl (Z)-(1RS)-cis-3-(2-chloro-3,3,3-trifluoroprop-1-enyl)-2,2-dimethylcyclopropanecarboxylate], 2-methyl-2-(4-bromodifluoromethoxyphenyl)propyl 3-phenoxybenzyl ether, tralomethrin [(S)-α-cyano-3-phenoxybenzyl (1R-cis)-3-{(1RS)(1,2,2,2-tetrabromoethyl)}-2,2-dimethylcyclopropanecarboxylate], silafluofen [(4-ethoxyphenyl){3-(4-fluoro-3-phenoxyphenyl)propyl}dimethylsilane], d-phenothrin [3-phenoxybenzyl (1R-cis,trans)-chrysanthemate], cyphenothrin [(RS)-α-cyano-3-phenoxybenzyl (1R-cis,trans)-chrysanthemate], d-resmethrin [5-benzyl-3-furylmethyl (1R-cis,trans)-chrysanthemate], acrinathrin [(S)-α-cyano-3-phenoxybenzyl (1R,cis(Z))-2,2-dimethyl-3-{3-oxo-3-(1,1,1,3,3,3-hexafluoropropyloxy) propenyl}cyclopropanecarboxylate], cyfluthrin [(RS)-α-cyano-4-fluoro-3-phenoxybenzyl 3-(2,2-dichlorovinyl)-2,2- dimethylcyclopropanecarboxylate], tefluthrin [2,3,5,6-tetrafluoro-4-methylbenzyl (1RS-cis(Z))-3-(2-chloro-3,3,3-trifluoroprop-1-enyl)-2,2-dimethylcyclopropanecarboxylate], transfluthrin [2,3,5,6-tetrafluorobenzyl (1R-trans)-3-(2,2-dichlorovinyl)-2,2-dimethylcyclopropanecarboxylate], tetramethrin [3,4,5,6-tetrahydrophthalimidomethyl (1RS)-cis,trans-chrysanthemate], allethrin [(RS)-3-allyl-2-methyl-4-oxocyclopent-2-enyl (1RS)-cis,trans-chrysanthemate], prallethrin [(S)-2-methyl-4-oxo-3-(2-propynyl)cyclopent-2-enyl (1R)-cis,trans-chrysanthemate], empenthrin [(RS)-1-ethynyl-2-methyl-2-pentenyl (1R)-cis,trans-chrysanthemate], imiprothrin [2,5-dioxo-3-(prop-2-ynyl)imidazolidin-1-ylmethyl (1R)-cis,trans-2,2-dimethyl-3-(2-methylprop-1-enyl)cyclopropanecarboxylate], d-furamethrin [5-(2-propynyl)furfuryl (1R)-cis,trans-chrysanthemate] and 5-(2-propynyl)furfuryl 2,2,3,3-tetramethylcyclopropanecarboxylate.

In embodiments of the present disclosure, the insecticide can be a neonicotinoid. In embodiments according to the present disclosure, the insecticide is clothianidin.

Insecticide compositions as described herein can comprise an effective amount of *Piper sarmentosum* extract or compositions derived thereof. An effective amount can be a concentration required to produce synergism with another insecticide (such concentration required can be an amount of *Piper sarmentosum* extract that increases knock down, mortality, repelling, or control of an insect in the presence of insecticide to a level beyond that of the insecticide without *Piper sarmentosum* extract, and such increase can be greater than an additive effect of *Piper sarmentosum* extract and the insecticide together). In certain aspects, synergism can also be defined as a greater than additive effect of two compounds or treatments applied together, although the co-exposure does not have to be immediate. One could be applied before the other (Cha Plu applied followed by application of insecticide, or vice versa).

An effective amount of *Piper sarmentosum* extract or compositions derived thereof can be a concentration of about 2.5 pg/mL to about 500 mg/mL; a concentration of about 2.5 pg/mL to about 250 mg/mL; a concentration of about 2.5 mg/mL to about 250 mg/mL; a concentration of about 250 pg/mL to about 250 mg/mL; a concentration of about 500 pg/m L to about 1 mg/mL; a concentration of about 750 pg/m L to about 750 μg/mL; a concentration of about 1 ng/m L to about 500 μg/mL; a concentration of about 250 ng/mL to about 150 μg/mL; a concentration of about 500 ng/mL to about 250 μg/mL; a concentration of about 750 ng/mL to about 1 μg/mL; or about 250 μg/mL In an embodiment, an effective amount is a concentration of about 2.5 ng/mL. In an embodiment, an effective amount can be about 4 μg. In an embodiment, an effective amount can be a concentration of about 4 μg/0.2 μL.

In embodiments according to the present disclosure, insecticide compositions as described herein can comprise about 0.001% to about 50% of the *Piper sarmentosum* extract. In embodiments according to the present disclosure, insecticide compositions as described herein can comprise about 0.001% to about 10% of the *Piper sarmentosum* extract. In embodiments according to the present disclosure, insecticide compositions as described herein can comprise about 0.5% to about 10% of the *Piper sarmentosum* extract. In embodiments according to the present disclosure, insecticide compositions as described herein can comprise about 1% to about 10% of the *Piper sarmentosum* extract. In embodiments according to the present disclosure, insecticide compositions as described herein can comprise about 1% to about 5% of the *Piper sarmentosum* extract. In embodiments according to the present disclosure, insecticide compositions as described herein can comprise about 2% to about 9% of the *Piper sarmentosum* extract. In embodiments according to the present disclosure, insecticide compositions as described herein can comprise about 3% to about 8% of the *Piper sarmentosum* extract. In embodiments according to the present disclosure, insecticide compositions as described herein can comprise about 4% to about 7% of the *Piper sarmentosum* extract. In embodiments according to the present disclosure, insecticide compositions as described herein can comprise about 5% to about 6% of the *Piper sarmentosum* extract. In embodiments according to the present disclosure, insecticide compositions as described herein can comprise about 0.5% to about 5% of the *Piper sarmentosum* extract. In embodiments according to the present disclosure, insecticide compositions as described herein can comprise about 5% to about 50% of the *Piper sarmentosum* extract. In embodiments according to the present disclosure, insecticide compositions as described herein can comprise about 10% to about 40% of the *Piper sarmentosum* extract. In embodiments according to the present disclosure, insecticide compositions as described herein can comprise about 15% to about 35% of the *Piper sarmentosum* extract. In embodiments according to the present disclosure, insecticide compositions as described herein can comprise about 20% to about 30% of the *Piper sarmentosum* extract. In embodiments according to the present disclosure, insecticide compositions as described herein can comprise about 25% of the *Piper sarmentosum* extract. In embodiments, insecticide compositions comprise about 5% of the *Piper sarmentosum* extract. In embodiments, insecticide compositions comprise about 5% w/v of the *Piper sarmentosum* extract. In embodiments, insecticide compositions comprise 4.5% to 5.5% of the *Piper sarmentosum* extract. In embodiments, insecticide compositions comprise 4% to 6% of the *Piper sarmentosum* extract. In embodiments, the percentage is % w/v.

Compositions as derived thereof can comprise rutin and/or vitexin. Compositions derived thereof can comprise rutin.

In addition to the *Piper sarmentosum* extract, insecticide compositions as described herein can comprise an effective amount of insecticide.

An effective amount of insecticide can be a concentration about 1 pM to about 100 μM. In embodiments, an effective amount of insecticide is a concentration of about 250 pM to about 1 μM. In embodiments, an effective amount of insecticide is a concentration of about 500 pM to about 750 nM. In embodiments, an effective amount of insecticide is a concentration of about 500 pM to about 750 nM. In embodiments, an effective amount of insecticide is a concentration of about 750 pM to about 500 nM. In embodiments, an effective amount of insecticide is a concentration of about 1 nM to about 250 nM. In embodiments, an effective amount of insecticide is a concentration of about 1 μM to about 100 μM. In embodiments, an effective amount of insecticide is a concentration of about 1 nM to about 100 nM. An effective amount of insecticide can be a concentration about 1 nM to about 100 nM. In an embodiment, an effective amount is about 0.2 ng/mg insect.

In embodiments, the effective amount of an insecticide composition can comprise about 2.5 ng/mL of Cha Plu (a.k.a. *Piper sarmentosum* extract) and a concentration of natural pyrethrins of about 1 nM. In embodiments, the effective amount of an insecticide composition can comprise about 2.5 ng/mL of Cha Plu (a.k.a. *Piper sarmentosum* extract) and a concentration of natural pyrethrins of about 10 nM. In embodiments, the effective amount of an insecticide composition can comprise about 2.5 ng/mL of Cha Plu (a.k.a. *Piper sarmentosum* extract) and a concentration of natural pyrethrins of about 100 nM.

In embodiments, the insecticide composition can comprise insecticide in an effective amount to knockdown down or induce mortality in a pest as described herein. In embodiments, the effective amount of insecticide is ±10%, ±20%, ±30%, or ±40% of a calculated $LD_{50}$ or $KD_{50}$ as disclosed herein, or an $LD_{50}$ or $KD_{50}$ adjusted based on values described herein and the body weight of the insect or pest species against which the composition should be used against. $LD_{50}$ and $KD_{50}$ values are provided as ng dose per mg of insect body weight. It would be understood by the skilled artisan that these values could be adjusted according to the desired insect species or genus against which compositions are to be used against. In embodiments, the insecticide composition can control an insect, which can mean to provide an economically useful interruption of the impact of the insect on humans, animals, plants, buildings, or the environment. In certain aspects, control can be repelling, knocking-down, or inducing mortality.

In embodiments, pesticidal compositions of the present disclosure comprise the insecticide composition and a carrier, for example an inert carrier, such as a solid carrier, a liquid carrier, a gaseous carrier and/or bait material (to make poison bait material).

Insecticidal compositions as described herein may be impregnated with a base material (e.g. porous ceramic board, non-woven cloth, paper, mosquito-coil base). Further, pesticidal compositions of the present disclosure optionally comprise a surfactant or the other auxiliary to be formulated to oil solutions, emulsifiable concentrates, wettable powders, flowable formulations, granules, dusts, aerosols, foggings, heating fumigants, smokings, poison baits, microcapsule formulations, ULV formulations, spot-on formulations, pour-on formulations, shampoo formulations, sheet formulations, resin formulations and so forth, as known in the art.

In embodiments, insecticidal compositions include the insecticidal composition as an active ingredient in an amount of 0.01 to 95% by weight.

Examples of a solid carrier to be used for formulations as described herein include fine powder or granules of clays (e.g. kaolin clay, diatomaceous earth, synthetic hydrated silicon oxide, bentonite, Fubasami clay, acid clay), talc, ceramics, fertilizer (e.g. ammonium sulfate, ammonium phosphate, ammonium nitrate, ammonium chloride, urea) and other inorganic minerals (e.g. sericite, quartz, sulfur, activated carbon, calcium carbonate, hydrated silicon oxide).

Examples of a liquid carrier for formulations as described herein include water, alcohols (e.g. methanol, ethanol), ketones (e.g. acetone, methyl ethyl ketone), aromatic hydrocarbons (e.g. toluene, xylene, ethylbenzene, methylnaphthalene), aliphatic hydrocarbons (e.g. hexane, cyclohexane, kerosene, gas oil), esters (ethyl acetate, butyl acetate), nitriles (e.g. acetonitrile, isobutyronitrile), ethers (e.g. diisopropyl ether, dioxane), acid amides (e.g. N,N-dimethylformamide, N,N-dimethylacetamide), halogenated hydrocarbons (dichloromethane, trichloroethane, carbon tetrachloride), organic sulfur compounds (e.g. dimethyl sulfoxide) and vegetable oils (e.g. soybean oil, cottonseed oil). Without intending to be limiting, other suitable carriers can be mineral oil, industrial grade emulsifiers, organic solvents, extracts, and others as known in the art.

Examples of a gaseous carrier include fluorocarbons, butane gas, LPG (liquefied petroleum gas), dimethyl ether and carbon dioxide.

Examples of a surfactant include alkyl sulfates, alkylsulfonates, alkylarylsulfonates, alkyl aryl ethers, polyoxyethylenealkyl aryl ethers, polyethylene glycol ethers, polyhydric alcohol esters and sugar alcohol derivatives.

Examples of the other auxiliaries include sticking agents, dispersing agent and stabilizing agents, typically, casein, gelatin, polysaccharides (e.g. starch, gum arabic, cellulose derivatives, alginic acid), lignin derivatives, synthetic water-soluble polymers (e.g. polyvinyl alcohol, polyvinylpyrrolidone, polyacrylic acids), PAP (acid isopropyl phosphate), BHT (2,6-di-tert-butyl-4-methyphenol), BHA (mixture of 2-tert-butyl-4-methoxyphenol and 3-tert-butyl-4.

As would be understood by the skilled artisan, insecticide compositions as described herein can comprise additional additives or fillers depending on the intended administration route and formulation. For example, formulations suitable for topical administration according to the present disclosure can be formulated as an ointment, cream, suspension, lotion, powder, solution, paste, gel, spray (for example an ultra-low volume spray), aerosol or oil. Alternatively, a formulation can comprise a patch, paper or plastic strip or a dressing such as a bandage or adhesive plaster impregnated with active ingredients, and optionally one or more excipients or diluents.

Methods of Using Insecticide Compositions

Also described herein are methods of use of insecticide compositions as described herein. As described herein regarding methods of the present disclosure, insecticide compositions as described herein can leverage synergism between the insecticide and *Piper sarmentosum* extract in order to improve efficacy of the insecticide composition. In certain aspects, the insecticide composition can improve knockdown over the use of the insecticide alone. In certain aspects, the insecticide composition can improve mortality compared to the use of the insecticide alone. In certain aspects, insecticide compositions comprising insecticides and *Piper sarmentosum* extract are combinations of compositions that are not naturally occurring, and provide a concentration of active ingredients in the compositions that are higher than what may be naturally occurring. In certain aspects, insecticide compositions comprising insecticides and *Piper sarmentosum* extract are combinations of compositions that are purified or isolated in a form that is not naturally occurring.

Methods of use of insecticide compositions as described herein can comprise administering a composition as described herein. Methods of use as described herein can comprising administering an insecticide composition as described herein to an environment or pest or both as described herein. Methods of use of insecticides as described herein comprise controlling, repelling, knocking-down, or killing pests and insects as described herein. In certain aspects, methods of controlling include knocking-down and inducing mortality.

Methods of administration can comprise administering a composition as described herein to an environment in need thereof. An environment in need thereof, without intending to be limiting, can comprise atmosphere (i.e. air) and/or one or more surfaces thereof (i.e. part of a plant, soil, vegetation therein, swamps, forests, fields, trees, surface of human living space, such as a floor, window, counter, furniture, and the like, skin of a subject in need thereof, such as the skin of a human) in which a mosquito (for example *Aedes aegypti* or *Anopheles gambiae*, or other genera such as *Culex*,

*Culiseta, Mansonia, Psorophora, Coquellitidia, Uranotaenia, Orthopodomyia, Wyeomyia, Corethrella*) or other insects or pests as described herein resides or otherwise are introduced to or at risk for introduction to (fly through, fly around, land on, rest on, etc.). In certain aspects, the environment in need thereof is an environment at risk for infestation of one or more pests as described herein. In certain aspects, an environment in need thereof can be any part (anatomical part) of the mosquito or insect or pest itself. In an embodiment, administering to an environment in need thereof comprises ingestion of an insecticide composition as described herein by a mosquito or insect pest as described herein.

In embodiments according to the present disclosure, an insecticide composition as described herein can be administered to an environment in need thereof in an effective amount. In embodiments according to the present disclosure, an insecticide composition as described herein can be administered to an environment in need thereof in an effective concentration. In embodiments according to the present disclosure, an effective amount, as described herein, is an amount suitable to induce knockdown and/or mortality of an insect, pest, or mosquito as described herein. As described herein, in embodiments according to the present disclosure, an effective amount is an amount suitable to induce knockdown and/or mortality of an insect, pest, or mosquito as described herein that is also an amount that is non-toxic to humans or other mammalian species. The same applies for effective concentrations. See the Examples below for embodiments of effective amounts.

In further aspects of the present disclosure, methods of applying or otherwise subjecting pests as described herein are described. Without intending to be limiting, other pests that can be subject to compositions and methods as described herein comprise other pests as follows. In embodiments, a pest can be an arthropod.

In certain embodiments, the arthropods killed, repelled, knocked down, or otherwise controlled by the compounds, compositions, or methods disclosed herein are Hemiptera insects, selected from Delphacidae (planthoppers), such as *Laodelphax striatellus* (small brown planthopper), *Nilaparvata lugens* (brown planthopper), *Sogatelia furcifera* (white-backed rice planthopper); Deltocephalidae (leafhoppers), such as *Nephotettix cincticeps* (green rice leafhopper), *Recilia dorsalis* (zig-zag rice leaf hopper), *Nephotettix virescens* (green rice leafhopper), Aphididae (aphids), stink bugs, Aieyrodidae (whiteflies), scales Tingidae (lace bugs), or Psyllidae (suckers).

In certain embodiments, the arthropods killed, repelled, knocked down, or otherwise controlled by the compounds, compositions, or methods disclosed herein are Lepidoptera Insects, selected from Pyralidae, such as *Chilo suppressalis* (rice stem borer), *Cnaphalocrocis medinalis* (rice leafroller), *Plodia interpunctella* (Indian meal moth); Noctuidae, such as *Spodoptera litura* (tobacco cutworm), *Pseudaletia separata* (rice armyworm), *Mamestra brassicae* (cabbage armyworm); Pieridae, such as *Pieris rapae crucivora* (common cabbageworm); Tortricidae, such as *Adoxophyes* spp.; Carposinidae; Lyonetiidae; Lymantriidae; Plusiinae; *Agrotis* spp. such as *Agrotis segetum* (turnip cutworm), or *Agrotis ipsilon* (black cutworm); *Helicoverpa* spp.; *Heliothis* spp.; *Plutella xylostella; Parnara guttata* (rice skipper); *Tinea pellionella* (casemaking clothes moth); or *Tineola bisselliella* (webbing clothes moth).

In certain embodiments, the arthropods killed, repelled, knocked down, or otherwise controlled by the compounds, compositions, or methods disclosed herein are Diptera Insects, *Culex* spp., such as *Culex pipiens pallens* (common mosquito), *Culex tritaeniorhynchus*, *Aedes* spp., such as *Aedes aegypti, Aedes albopictus; Anopheles* spp., such as *Anopheles sinensis*; Chironomidae (midges); Muscidae, such as *Musca domestica* (housefly), *Muscina stabulans* (false stablefly), *Musca autumnalis* (face fly), *Fannia canicularis* (little housefly); Calliphoridae; Sarcophagidae; Anthomyiidae, such as *Delia platura* (seedcorn maggot), *Delia antiqua* (onion maggot); Tephritidae (fluit flies); Drosophilidae; Psychodidae (moth flies); Tabanidae; Simuliidae (black flies); Stomoxyidae (stable flies); Phoridae; or Ceratopogonidae (biting midges).

In certain embodiments, the arthropods killed, repelled, knocked down, or otherwise controlled by the compounds, compositions, or methods disclosed herein are Coleoptera Insects (Beetles), several nonlimiting examples of which include Corn rootworms, such as *Diabrotica virgifera* (western corn rootworm), *Diabrotica undecimpunctata howardi* (southern corn rootworm); Scarabaeidae (scarabs), such as *Anomala cuprea* (cupreous chafer), *Anomala rufocuprea* (soybean beetle); Curculionidae (weevils), such as *Sitophilus zeamais* (maize weevil), *Lissorhoptrus oryzophilus* (rice-water weevil), ball weevil, *Callosobruchus chinensis* (adzuki bean weevil); Dermestidae, such as *Authrenus verbasci* (varied carpet beetle), *Attagenus unicolor japonicus* (black carpet beetle); Tenebrionidae (darkling beetles), such as *Tenebrio molitor* (yellow mealworm), or *Tribolium castaneum* (red flour beetle); Chrysomelidae (leaf beetles) such as *Oulema oryzae* (rice leaf beetle), *Phyllotreta striolata* (striped flea beetle), *Aulacophora femoralis* (cucurbit leaf beetle); Anobiidae; *Epilachna* spp. such as *Epilachna vigintioctopunctata* (twenty-eight-spotted ladybird); Lyctidae (powderpost beetles), Bostrychidae (false powderpost beetles), or Cerambycidae, *Paederus fuscipes* (robe beetle).

In certain embodiments, the arthropods killed, repelled, knocked down, or otherwise controlled by the compounds, compositions, or methods disclosed herein are Dictyoptera Insects, such as the following: *Blattella germanica* (German cockroach); *Periplaneta fuliginosa* (smokybrown cockroach); *Periplaneta americana* (American cockroach); *Periplaneta brunnea* (brown cockroach); or *Blatta orientalis* (oriental cockroach).

In certain embodiments, the arthropods killed, repelled, knocked down, or otherwise controlled by the compounds, compositions, or methods disclosed herein are Thysanoptera Insects (*Thrips*), such as *Thrips palmi, Flankliniella occidentalis* (western flower thrips), or *Thrips hawaiiensis* (flower thrips).

In certain embodiments, the arthropods killed, repelled, knocked down, or otherwise controlled by the compounds, compositions, or methods disclosed herein are Hymenoptera Insects, such as Formicidae (ants); Vespidae (hornets); *Polistes* spp. (long-legged wasps); Bethylidae, or Tenthredinidae (sawflies), such as *Athalis rosae ruficornis* (cabbage sawfly).

In certain embodiments, the arthropods killed, repelled, knocked down, or otherwise controlled by the compounds, compositions, or methods disclosed herein are Orthoptera Insects, such as Gryllotalpidae (mole crickets); or Acrididae (grasshoppers).

In certain embodiments, the arthropods killed, repelled, knocked down, or otherwise controlled by the compounds, compositions, or methods disclosed herein are Siphonaptera Insects (Fleas), such as *Ctenocephalides canis* (dog flea); *Ctenocephalides felis* (cat flea); or *Pulex irritans*.

In certain embodiments, the arthropods killed, repelled, knocked down, or otherwise controlled by the compounds, compositions, or methods disclosed herein are Anoplura Insects (Lice), such as *Pediculus corporis* (body louse); *Pediculus humanus* (head louse); or *Pthirus pubis* (crab louse).

In certain embodiments, the arthropods killed by the compounds, compositions, or methods disclosed herein are Isoptera Insects, such as *Reticulitermes speratus; Coptotermes formosanus* (Formosan subterranean termite).

In certain embodiments, the arthropods killed, repelled, knocked down, or otherwise controlled by the compounds, compositions, or methods disclosed herein are Harmful Acarina, such as Ixodidae (Ticks): *Boophilus microplus; Haemaphysalis longiconis* Tetranychidae (spider mites): *Tetranychus cinnabarinus* (carmine spider mite); *Tetranychus urticae* (two-spotted spider mite); *Tetranychus kanzawai* (Kanzawa spider mite); *Panonychus citri* (citrus red mite); *Panonychus ulmi* (European red mite); House-dust Mites: Acaridae such as *Tyrophagus putrescentiae* (copra mite), *Aleuroglyphus ovatus* (brown legged grain mite); Dermanyssidae such as *Dermatophagoides farinae* (American house dust mite), *Dermatophagoides pteronyssinus*; mites parasitizing honeybees, such as *Varroa jacobsoni; Euvarroa sinhai, Acarapis woodi; Tropilaelaps clareae*; Glycyphagidae, such as *Glycyphagus privatus, Glycyphagus domesticus, Glycyphagus destructor*, Cheyletidae, such as *Chelacaropsis malaccensis, Cheyletus fortis*; Tarsonemidae; *Chortoglyphus* spp.; *Haplochthonius* spp. Chilognatha (millipedes), such as *Oxydus* spp.; Chilopoda (centipedes), such as red centipede; wood lice, such as *Porcellio* spp., *Porcellionides* spp.; and pill bugs, such as *Armadillidium* spp.

In certain embodiments, the arthropods killed, repelled, knocked down, or otherwise controlled by the compounds, compositions, or methods disclosed herein are harmful species such as salmon louse (*Lepeophtheirus salmonis*) or related copepod parasites of fish.

In embodiments, the pest comprises one or more of: Diptera Insects (for example: *Culex* spp. such as *Culex pipiens pallens* (common mosquito), *Culex tritaeniorhynchus* and the like, *Aedes* spp. such as *Aedes aegypti, Aedes albopictus* and the like; *Anopheles* spp. such as *Anopheles sinensis* and the like; Chironomidae (midges); Muscidae such as *Musca domestica* (housefly), *Muscina stabulans* (false stablefly), *Fannia canicularis* (little housefly) and the like; Calliphoridae; Sarcophagidae; Anthomyiidae such as *Delia platura* (seedcorn maggot), *Delia antiqua* (onion maggot) and the like; Tephritidae (fluit flies); Drosophilidae; Psychodidae (moth flies); Tabanidae; Simuliidae (black flies); Stomoxyidae (stable flies); Phoridae; Ceratopogonidae (biting midges) and the like; Coleoptera Insects (Beetles) (for example: Corn rootworms such as *Diabrotiaa virgifera* (western corn rootworm), *Diabrotica undecimpunctata howardi* (southern corn rootworm) and the like; Scarabaeidae (scarabs) such as *Anomala cuprea* (cupreous chafer), *Anomala rufocuprea* (soybean beetle) and the like; Curculionidae (weevils) such as *Sitophilus zeamais* (maize weevil), *Lissorhoptrus otyzophilus* (ricewater weevil), ball weevil, *Callosobruchus chinensis* (adzuki bean weevil) and the like; Dermestidae such as *Authrenus verbasci* (varied carpet beetle), *Attagenus unicolor japonicus* (black carpet beetle) and the like; Tenebrionidae (darkling beetles) such as *Tenebrio molitor* (yellow mealworm), *Tribolium castaneum* (red flour beetle) and the like; Chrysomelidae (leaf beetles) such as *Oulema oryzae* (rice leaf beetle), *Phyliotreta striolata* (striped flea beetle), *Aulacophora femoralis* (cucurbit leaf beetle) and the like; Anobiidae; *Epilachna* spp. such as *Epilachna vigintioctopunctata* (twenty-eight-spotted ladybird) and the like; Lyctidae (powderpost beetles), Bostrychidae (false powderpost beetles), Cerambycidae, *Paederus fuscipes* (robe beetle) and the like).

In certain embodiments, the insect killed, repelled, knocked down, or otherwise controlled by the compounds, compositions, or methods disclosed herein is selected from the group consisting of a fly, spider, butterfly, crab, mosquito, centipede, tick, millipede, or scorpion. In certain embodiments, the insect is a mosquito. In certain embodiments, the mosquito is of the species, *Aedes aegypti*.

Without intending to be limiting, administration of compositions as described herein according to methods as described herein can comprise aerosol administration, topical administration (i.e. by way of a cream or oil), injection by a needle or syringe, or other methods as known in the art, for example vaporization by the application of heat from a flame, fire, ultrasound, or electricity. Additional administration methods can comprise granular administration, dust administration, or administration by a wettable powder.

Applicating Kits, Devices, and Systems

Also described herein are insecticide-applicating devices and systems. Insecticide-applicating devices comprise insecticide compositions as described herein and an applicator. Applicators as described herein can be, for example, an aerosol spray can, a pump-spray bottle, a package for pharmaceutical cream (tube, etc), a syringe for injection, and such. In other embodiments, devices, systems, and methods as described herein (comprising insecticide compositions as described herein or effective amounts thereof) can be a space sprays, aerosols, ultra-low-volume sprays, fogging, treated surface, applied to livestock or companion animal, insecticidal bait stations, aerial applications, spray pump treatments, and the like as known in the art.

Finally described herein are insecticide kits. Kits as described herein can comprise an insecticide composition as described herein; and an applicator.

Without intending to be limiting, the applicator can be an aerosol spray can, a pump-spray bottle, a package for pharmaceutical cream, a fogger can, a bait station, or a syringe for injection. Applicators can further comprise other applicators known in the art.

Methods for Extracting Cha Plu Bioactive Constituents

In certain aspects, *Piper sarmentosum* extract can be obtained via organic solvent extraction. According to an embodiment according to the present disclosure, a method of extract is as follows. 5 g dry weight of *Piper sarmentosum* was crushed and placed in beaker. Exactly 200 mL of 9:1 ethyl acetate:methanol was used to extract from the plant material using gentle agitation. Course plant material was strained using a Whatman No. 2 filter paper and the remaining organic solvent and was allowed to air dry for 24 hr. The crude, dry extract was then used for synergism studies.

EXAMPLES

Now having described the embodiments of the disclosure, in general, the examples describe some additional embodiments. While embodiments of the present disclosure are described Example 1

*Piper Sarmentosum* Significantly Synergizes Pyrethroids Applied Topically to *Aedes Aegypti* Mosquitoes:

"Cha Plu" (*Piper sarmentosum*) is a plant that has been used as a folk medicine for generations in Asia. Other groups have reported that it contains numerous alkylamides and phenylpropanoids in specific ratios/combinations not found in other plants. We screened an extract from this plant as a synergist and insecticide against *Aedes aegypti* to determine whether these compounds represented novel and efficacious leads for the development of new insecticidal formulations. It has been found that *Piper sarmentosum* extract significantly synergizes the activity of natural pyrethrins. This enhancement was observed on both live insects and on the *Drosophila melanogaster* larval central nervous system (CNS). This non-obvious and novel bioactivity of Cha Plu represents an advancement in novel insecticide formulations and methods. The present example demonstrates the potential of "Cha Plu" as a future insecticidal additive or may lead to the development of better synergistic or insecticidal mixtures in future formulations.

Figure 3:
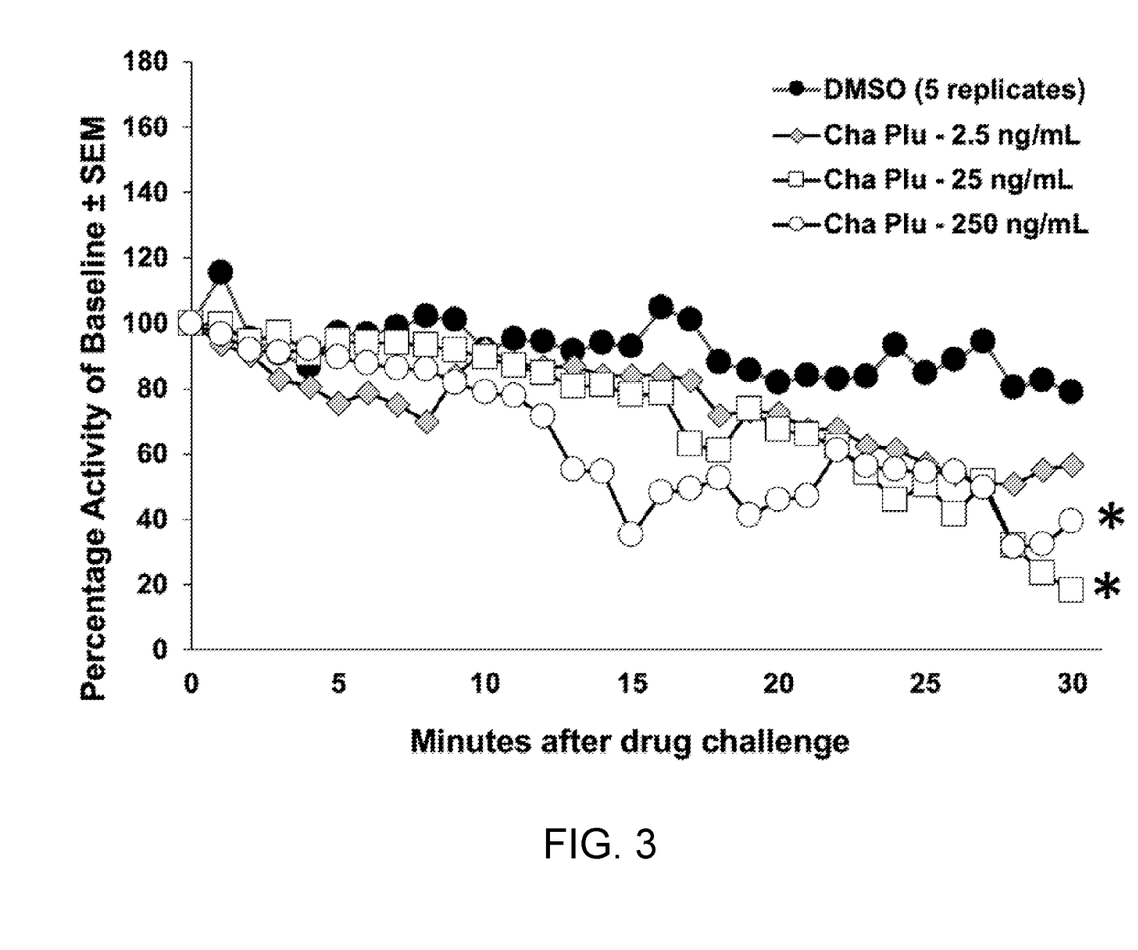
FIG. 3 is a plot showing the effect of "Cha Plu" extract on *D. melanogaster* CNS compared with a vehicle application control (DMSO). Both 25 ng/mL and 250 ng/mL application concentrations caused statistically-significant nerve block ($p<0.05$) at 30 minutes compared to the control, as indicated by the asterisk. As 2.5 ng/mL did not cause significant block at 30 minutes post-application, that concentration was used to assess synergism with natural pyrethrins.

The usual mechanism of action of insecticide synergists is to block metabolism of the insecticide and thereby increase toxicity, as observed for PBO, which is an inhibitor of cytochrome P450 mono-oxygenases. In additional experiments, it was sought to determine whether any synergism was observed from Cha Plu plus NP when applied to the larval nervous system of *Drosophila melanogaster*. In preliminary studies, Cha Plu extract alone was able to block spontaneous nerve discharge in the CNS at 25 and 250 ng/mL concentrations, compared to DMSO controls (FIG. 3). Cha Plu at 2.5 ng/mL, normally an inactive concentration, synergized block of nerve firing at 10 and 100 nM NP (FIG. 4). in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

FIG. 3 shows the effect of "Cha Plu" extract on *D. melanogaster* CNS compared with a vehicle application control (DMSO). Both 25 ng/mL and 250 ng/mL application concentrations caused significant block at 30 minutes compared to the control. As 2.5 ng/mL did not cause significant block at 30 minutes post-application, that concentration to assess synergism with natural pyrethrins.

Figure 4:
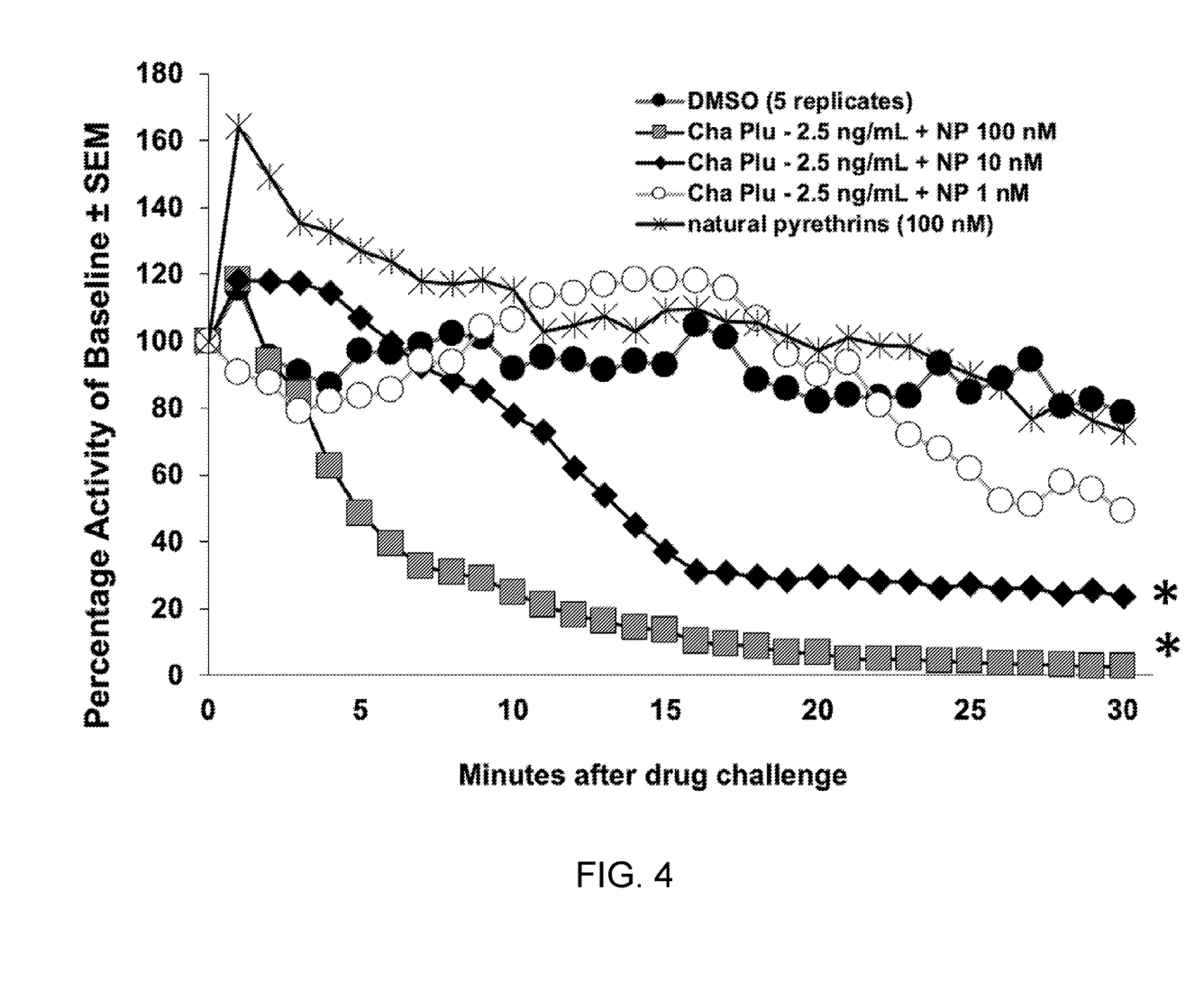
FIG. 4 is a plot showing the effect of "Cha Plu" extract on *D. melanogaster* CNS applied in combination with a doses of NP that do not produce significant block at 30 minutes. "Cha Plu" synergized natural pyrethrins applied at 100 nM and 10 nM, indicating a synergism of greater than or equal to 10-fold.

FIG. 4 shows the effect of "Cha Plu" extract on CNS applied in combination with a dose of NP that does not produce significant block at 30 minutes. "Cha Plu" synergized natural pyrethrins applied at 100 nM and 10 nM, indicating a synergism of greater than or equal to 10-fold.

Accordingly, Cha Plu may be a suitable substitute for PBO in places where this synergist is unavailable, such as the developing countries in Asia. In addition, PBO is under renewed scrutiny by the USEPA over concerns of its toxicity to aquatic organisms.

Example 2

Methods for Synergism of Insecticidal Ingredients—Topically Applied

*Aedes aegypti* mosquitoes of the insecticide susceptible Orlando strain and the pyrethroid-resistant Puerto Rico strain were reared using standard protocols and provided by the United States Department of Agriculture—Center of Medical, Agricultural, and Veterinary Entomology (Gainesville, FL). Mosquitoes were aspirated from colony cages raised from pupae and anesthetized on ice. Mosquitoes were then treated with 0.2 µL of variable concentrations of insecticidal active ingredients using a repeating micro-applicator (Hamilton Co., Reno, NV). Ten mosquitoes were used per concentration and at least three different biological cohorts were used in the analysis. Knockdown (defined as inability to fly or maintain posture) was recorded at 1 hr or other time points post application (depending on the experiment), whereas mortality (defined as no movement—ataxia) was recorded at 24 hr. Concentrations that produced 10-90% mortality at 24 hr post exposure were used in the analysis to calculate the lethal dose required to kill 50% of the population ($LD_{50}$). Synergism studies were performed using the maximal sublethal dose of Cha Plu in combination with varying concentrations of insecticide to calculate the $LD_{50}$ value of the insecticide+synergist mixture. SAS 9.4 was used to calculate the $LD_{50}$ values using a PROC PROBIT model with Abbott's correction to account for any control mortality.

Synergism Performance Data by Cha Plu

TABLE 1

Synergism of select insecticides by *Piper sarmentosum* ("Cha Plu") extract. Synergist ratio (SR) = $LD_{50}$ insecticide alone ÷ $LD_{50}$ of insecticide + Cha Plu.

| Treatment | N | $LD_{50}$ (ng/mg) | SR |
|---|---|---|---|
| Natural pyrethrins (NP) | 290 | 1.53 | — |
| Cha Plu (4 µg/female) + NP | 160 | 0.15 | 10.2 |
| Clothianidin | 180 | 4.5 | — |
| Cha Plu (4 µg/female) + Clothianidin | 150 | 0.19 | 23.7 |
| Fipronil | 120 | 0.1 | — |
| Cha Plu (4 ug/female) + Fipronil | 120 | 0.098 | 1.02 |
| Dibrom | 180 | 1.5 | — |
| Cha Plu (4 µg/female) + Dibrom | 150 | >1.5 | Antagonism |
| Chlorfenapyr | 120 | 9.9 | — |
| Cha Plu (4 ug/female) + Chlorfenapyr | 120 | 18.2 | Antagonism |

Cha Plu at 4 µg/female was a strong synergist of natural pyrethrins and the synthetic insecticide clothianidin (Table 1). For comparison, PBO applied at 2 µg/female synergizes NP only 3.8-fold. In contrast, there was no synergism of the insecticide fipronil (SR=1.02) and antagonism was observed when Cha Plu was tested with dibrom and chlorfenapyr, proinsecticides that require chemical alteration to their active form before they become toxic.

TABLE 2

Synergism of select insecticides by flavonoids within *Piper sarmentosum* ("Cha Plu") extract major constituents, vitexin and rutin.

| Treatment | N | $LD_{50}$ (ng/mg) | SR |
|---|---|---|---|
| Natural pyrethrins (NP) | 290 | 1.53 | — |
| +vitexin (2 ug/female) | 100 | 1.52 | 1 |
| +rutin (2 ug/female) | 110 | 0.47 | 3.26 |

A limited series of experiments explored the activity of two Cha Plu constituents, vitexin and rutin as synergists of NP (Table 2). Vitexin was inactive, but rutin showed a bit more than 3-fold synergism.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In embodiments, as used herein "about" encompasses values that are within ±1%, ±2%, ±3%, ±4%, or ±5% of the reference value. In addition, the phrase "about 'x' to 'y'" includes "about 'x' to about 'y'".

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

Embodiments of the present disclosure will employ, unless otherwise indicated, techniques of separating, testing, and constructing materials, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. An insecticide composition, comprising:
    Piper sarmentosum extract; and
    an insecticide, wherein the insecticide is a neonicotinoid.
2. The insecticide composition of claim 1, wherein the Piper sarmentosum extract consists of rutin.
3. The insecticide composition of claim 1, wherein the neonicotinoid is clothianidin.
4. The insecticide composition of claim 1, further comprising a carrier.
5. The insecticide composition of claim 1, wherein the insecticide composition comprises an effective amount of Piper sarmentosum extract at a concentration required to produce synergism with the insecticide.
6. The insecticide composition of claim 1, wherein the insecticide composition comprises an effective amount of Piper sarmentosum extract and insecticide effective to induce knockdown or mortality of a pest by about 50% or more.
7. The insecticide composition of claim 5, wherein the effective amount of Piper sarmentosum extract is a concentration of about 2.5 pg/mL to about 500 mg/mL.
8. The insecticide composition of claim 1, wherein the effective amount of insecticide is a concentration of about 1 pM to about 100 µM.
9. A method of controlling an insect or pest, comprising:
    administering an insecticide composition of claim 1 to an environment in need thereof, a mosquito, or both, wherein the environment in need thereof comprises a mosquito or at risk for introduction of one or more mosquitos.
10. The method of claim 9, wherein the insecticide composition comprises an effective amount of Piper sarmentosum extract at a concentration required to produce synergism with the insecticide.
11. The method of claim 9, wherein the insecticide composition is administered in an amount effective to induce knockdown or mortality by about 50% or more.
12. The method of claim 10, wherein the effective amount of the insecticide composition comprises a concentration of Piper sarmentosum extract of about 2.5 pg/mL to about 500 mg/mL.
13. The method of claim 10, wherein the effective amount of the insecticide composition comprises a concentration of insecticide of about 1 pM to about 100 µM.
14. The method of claim 10, wherein the effective amount of insecticide composition comprises a concentration of Piper sarmentosum extract of about 2.5 ng/ml and a concentration of insecticide of about 1 nM to about 100 nM.
15. The composition of claim 1, wherein the insecticide composition comprises a concentration of Piper sarmentosum extract of about 2.5 ng/ml and a concentration of insecticide of about 10 nM to about 100 nM.
16. An insecticide composition, comprising:
    Piper sarmentosum extract; and
    an insecticide, wherein the insecticide is one or more of natural pyrethrins and a neonicotinoid.
17. The insecticide composition of claim 16, wherein the neonicotinoid is clothianidin.
18. The insecticide composition of claim 16, further comprising a carrier.
19. The insecticide composition of claim 16, wherein the insecticide composition comprises a concentration of Piper sarmentosum extract of about 2.5 ng/ml and a concentration of insecticide of about 10 nM to about 100 nM.

* * * * *